(12) United States Patent
Liang et al.

(10) Patent No.: US 12,003,764 B2
(45) Date of Patent: Jun. 4, 2024

(54) PREDICTION METHOD FOR CURRENT BLOCK AND ELECTRONIC DEVICE

(71) Applicant: GUANGDONG OPPO MOBILE TELECOMMUNICATIONS CORP., LTD., Guangdong (CN)

(72) Inventors: Fan Liang, Guangdong (CN); Jian Cao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 152 days.

(21) Appl. No.: 17/704,443

(22) Filed: Mar. 25, 2022

(65) Prior Publication Data

US 2022/0217399 A1    Jul. 7, 2022

Related U.S. Application Data

(63) Continuation of application No. PCT/CN2019/108684, filed on Sep. 27, 2019.

(51) Int. Cl.
*H04N 19/593* (2014.01)
*H04N 19/159* (2014.01)
*H04N 19/176* (2014.01)
*H04N 19/61* (2014.01)
*H04N 19/70* (2014.01)

(52) U.S. Cl.
CPC ......... *H04N 19/593* (2014.11); *H04N 19/159* (2014.11); *H04N 19/176* (2014.11); *H04N 19/61* (2014.11); *H04N 19/70* (2014.11)

(58) Field of Classification Search
CPC .................................................. H04N 19/593
USPC ....................................................... 375/240.12
See application file for complete search history.

(56) References Cited

U.S. PATENT DOCUMENTS

| | | | |
|---|---|---|---|
| 9,172,972 B2 | 10/2015 | Chong et al. | |
| 2017/0070748 A1* | 3/2017 | Li | H04N 19/115 |
| 2017/0289566 A1 | 10/2017 | He et al. | |

FOREIGN PATENT DOCUMENTS

| | | |
|---|---|---|
| CN | 102915553 A | 2/2013 |
| CN | 104702954 A | 6/2015 |
| CN | 105917650 A | 8/2016 |
| CN | 107079161 A | 8/2017 |
| CN | 109996080 A | 7/2019 |
| JP | 2017512026 A | 4/2017 |

(Continued)

OTHER PUBLICATIONS

Indian First Examination Report for IN Application 202217023211 dated Sep. 5, 2022. (6 pages).

(Continued)

*Primary Examiner* — Jeffery A Williams
(74) *Attorney, Agent, or Firm* — Young Basile Hanlon & MacFarlane, P.C.

(57) ABSTRACT

A prediction method for a current block and an electronic device are provided, where the method includes the following. Mode information of an intra block copy-mirror mode is obtained when in a non-merge mode of intra block copy. Determine whether to perform mirror transform on a reference block according to the mode information. A prediction block of the current block is obtained by performing mirror transform on the reference block when a determination result is performing mirror transform on the reference block.

20 Claims, 7 Drawing Sheets

(56) References Cited

FOREIGN PATENT DOCUMENTS

| WO | 2015139175 A1 | 9/2015 | |
|---|---|---|---|
| WO | WO-2015131326 A1 * | 9/2015 | ........... H04N 19/105 |
| WO | 2019128716 A1 | 7/2019 | |

OTHER PUBLICATIONS

International Search Report with English Translation for PCT Application PCT/CN2019/108684 dated Jun. 23, 2020. (11 pages).
Japanese Notice of Reasons for Refusal with English Translation for JP Application 2022518879 dated Sep. 29, 2023. (9 pages).
MediaTek Inc., Symmetric intra block copy, Joint Collaborative Team on Video Coding (JCT-VC) of ITU-T SG 16 WP 3 and ISO/IEC JTC 1/SC 29/WG 11, JCTVC-Q0082, Mar. 27-Apr. 4, 2014. (2 pages).
Samsung Electronics Co., Ltd., CE8-related: Flipping of reference blocks for Intra Block Copy (IBC), Joint Video Experts Team (JVET) of ITU-T SG 16 WP 3 and ISO/IEC JTC 1/SC 29/WG 11, JVET-O0443, Jul. 3-12, 2019. (3 pages).

* cited by examiner

PREDICTION METHOD FOR CURRENT BLOCK AND ELECTRONIC DEVICE

CROSS-REFERENCE TO RELATED APPLICATION(S)

This application is a continuation of International Application No. PCT/CN2019/108684, filed Sep. 27, 2019, the disclosure of which is hereby incorporated by reference in its entirety.

TECHNICAL FIELD

This disclosure relates to electronic technologies, and relates to, but is not limited to, a prediction method for a current block and an electronic device.

BACKGROUND

Although an intra block copy (IBC) mode can utilize characteristics of many repeated regions, it is still based on a translational motion model for intra prediction. In the IBC mode based on the translational model, all samples in a coding block share the same block vector (BV), and a reference block and the coding block are exactly the same.

However, in the process of encoding, there is a complex motion such as mirror flipping, and the IBC mode based on the translational motion model cannot make good use of this characteristic for encoding.

SUMMARY

In a first aspect, implementations of this application provide a prediction method for a current block. The method is for a video encoder and includes the following. Mode information of an intra block copy-mirror mode is obtained when in a non-merge mode of intra block copy. Whether to perform mirror transform on a reference block is determined according to the mode information. A prediction block of the current block is obtained by performing mirror transform on the reference block when a determination result is performing mirror transform on the reference block.

In a second aspect, implementations of this application provide a prediction method for a current block. The method is for a video decoder and includes the following. A bitstream is parsed to obtain mode information of an intra block copy-mirror mode. Whether to perform mirror transform on a reference block is determined according to the mode information. A prediction block of the current block is constructed by performing mirror transform on the reference block, when a determination result is performing mirror transform on the reference block.

In a third aspect, implementations of this application provide an electronic device. The electronic device includes at least one processor and a memory. The memory is coupled to the at least one processor and stores at least one computer executable instruction thereon. The at least one computer executable instruction, when executed by the at least one processor, causes the at least one processor to execute the method of the first aspect.

DETAILED DESCRIPTION

In order to make the objectives, technical solutions, and advantages of implementations of this application clearer, the specific technical solutions of this application will be described in further detail below with reference to accompanying drawings in the implementations of this application. The following implementations are used to illustrate this application, but are not intended to limit the scope of this application.

Unless otherwise defined, all technical and scientific terms used herein have the same meaning as commonly understood by one of ordinary skill in the technical field to which this application belongs. The terms used herein are only for describing the purpose of the implementations of this application, and are not intended to limit this application.

In the following description, reference is made to "some implementations", which describe a subset of all possible implementations. It can be understood, however, that "some implementations" may be the same subset or different subsets of all possible implementations, and may be combined without conflict.

It should be pointed out that, the terms "first\second\third" involved in the implementations of this application are only used to distinguish similar objects, and do not represent a specific ordering of objects. It can be understood that, "first\second\third" can be swapped in a specific order or sequence if permitted, so that the implementations of this application described herein can be implemented in sequences other than those illustrated or described herein.

Before further describing of the implementations of this application in detail, the nouns and terms involved in the implementations of this application will be described. The nouns and terms involved in the implementations of this application are applicable to the following explanations.

1) screen content coding, SCC.
2) intra block copy, IBC.
3) Rdcost: rate-distortion Cost.
4) sum of absolute differences, SAD.
5) block vector, BV.
6) IBC-mirror mode.
7) coding tree unit, CTU.
8) coding unit, CU.
9) prediction unit, PU.

Figure 1:
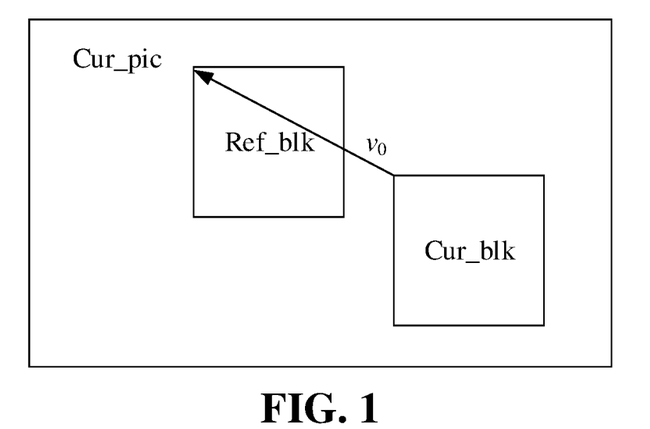
FIG. 1 is a schematic diagram of a mapping relationship between a coding unit and a reference unit in the related art.

In related art, an IBC mode is turned on when a screen content sequence is encoded, and the BV is used to establish a reference relationship between a current coding unit and a reference unit, so as to predict samples of the current coding unit. In the IBC mode, the reference block must be in an encoded region of a current frame, and must be in a CTU where a current coding block is located or a left neighbouring CTU. The reference relationship is illustrated in FIG. 1. Cur_blk is used to represent the current coding block, and Ref_blk is used to represent a reference coding block. Cur_pic is used to represent the current picture.

The IBC mode is based on a translational motion model for motion estimation, that is, all samples in a coding block share the same BV. Because it is a translational model, the coding block and the reference block are exactly the same, that is, the coding block and the reference block have the same width, height, and each sample value of the corresponding position, as illustrated in FIG. 2(*a*) and FIG. 2(*b*).

Figure 2:
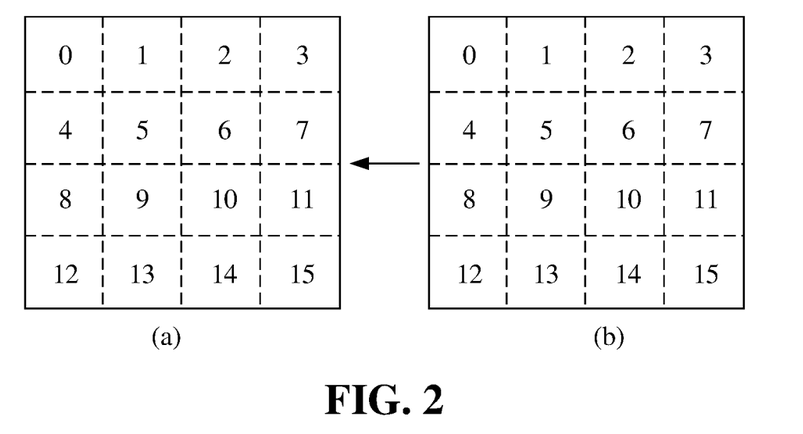
FIG. 2 is a schematic diagram of samples in a reference block and a coding block in the related art.

2(*a*) corresponds to the reference block and FIG. 2(*b*) corresponds to the coding block. In this implementation, both the reference block and the coding block have the size of 4*4, and samples at corresponding positions in these two are the same.

Although the IBC mode can utilize characteristics of many repeated regions, it is still based on the translational motion model for intra prediction. In the IBC mode based on the translational model, all samples in a coding block share the same BV, and the reference block and the coding block are exactly the same. However, in the screen content coding sequence, there is a complex motion such as mirror flipping, and the IBC mode based on the translational motion model cannot make good use of this characteristic for encoding. In addition, to ensure the picture quality, in the IBC mode based on translational motion, an encoder will tend to partition an object into small units, and use translational motion of small units to approximate mirror motion. This partitioning and prediction method will bring a lot of redundant information such as partitioning information, which will affect compression performance.

Figure 3:
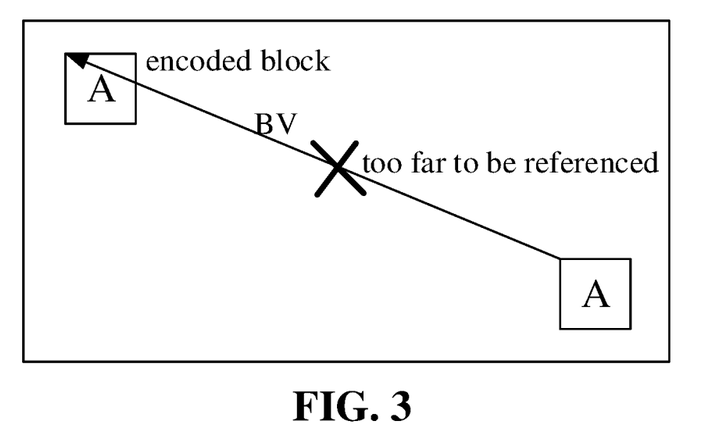
FIG. 3 is a schematic diagram illustrating intra block copy (IBC) not working well in the related art.

For example, most of the 26 letters common to the screen content sequence have mirror characteristic or approximate mirror characteristic, such as A, B, C, D, E, H, I, K, M, O, T, U, V, W, X, Y, etc. As illustrated in FIG. 3, if the character "A" is encoded using the traditional IBC mode, the previously encoded character "A" must be referenced. If these two are far apart, beyond the search range of the BV, the encoded block cannot be used as the reference block, so that the IBC mode cannot work well, which affects compression efficiency.

Figure 4:
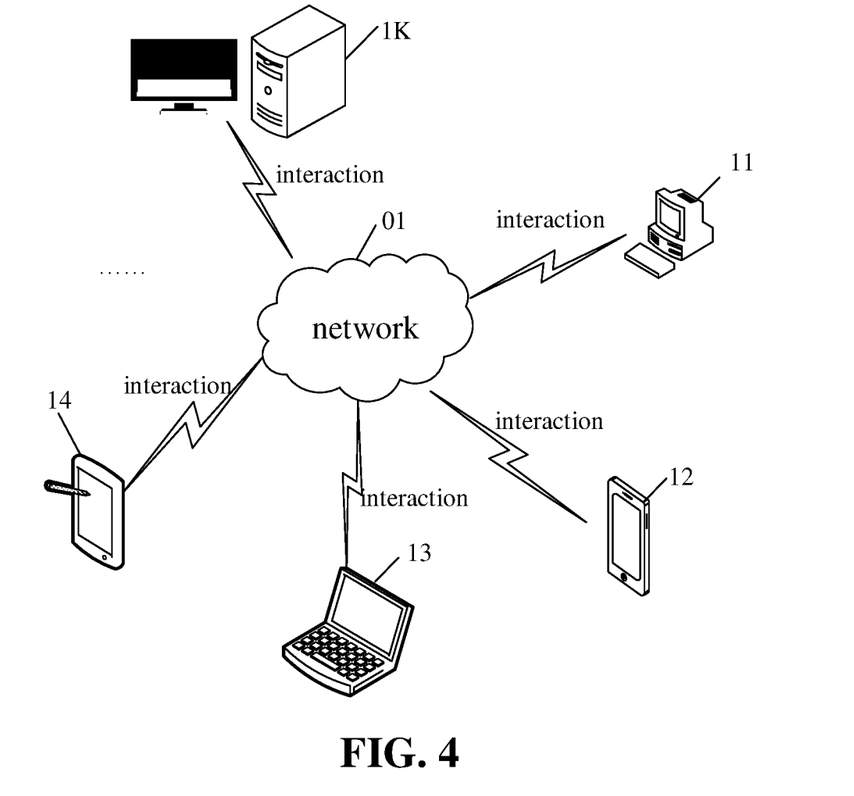
FIG. 4 is a schematic structural diagram of a structure of a network architecture provided in implementations of this application.

This implementation first provides a network architecture. FIG. 4 is a schematic structural diagram of a network architecture of implementations of this application. As illustrated in FIG. 4, the network architecture includes one or more electronic devices 11-1K and a communication network 01. The electronic devices 11-1K can perform video interaction through the communication network 01. In the implementation process, the electronic device may be any of various types of devices with video encoding and decoding functions. For example, the electronic device may include a cell phone, a tablet computer, a personal computer, a television, a server, or the like. The electronic device has video encoding and decoding functions, including a video encoder and/or a video decoder.

Implementations of this application provide a prediction method for a current block. The functions implemented by the method can be implemented by invoking the program code by the processor in the electronic device. Certainly, the program code can be stored in a computer storage medium. It can be seen that, the electronic device at least includes a processor and a storage medium.

Figure 5:
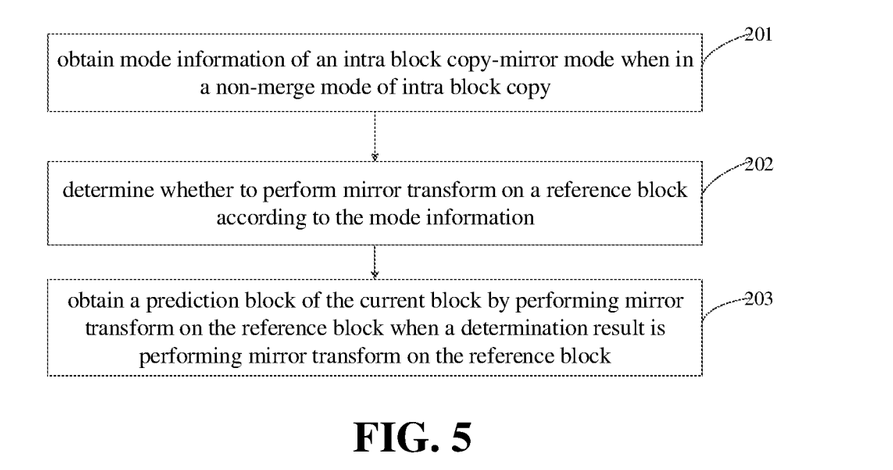
FIG. 5 is a schematic diagram of an implementation procedure of a prediction method for a current block provided in implementations of this application.

Based on the above, implementations of this application provide a prediction method for a current block, applicable to a video encoder. As illustrated in FIG. 5, the method includes the following steps.

Step 201, mode information of an intra block copy-mirror mode is obtained when in a non-merge mode of intra block copy.

In the implementation of this application, the video encoder can determine whether it is in the non-merge mode of the intra block copy or a merge mode of the intra block copy according to the merge flag. When the video encoder determines that it is in the non-merge mode of the intra block copy, it obtains the mode information of the intra block copy-mirror mode.

Step 202, whether to perform mirror transform on a reference block is determined according to the mode information.

In the implementation of this application, the reference block is located in a current picture where the current block is located, or the reference block is located in an encoded picture before the current picture is encoded.

Herein, performing mirror transform on the reference block includes performing horizontal mirror transform on the reference block or performing vertical mirror transform on the reference block.

In the implementation of this application, the video encoder may, according to the mode information, determine whether to perform mirror transform on the reference block, and determine which mirror transform, such as horizontal mirror transform or vertical mirror transform, is to be performed on the reference block.

Step 203, a prediction block of the current block is obtained by performing mirror transform on the reference block when a determination result is performing mirror transform on the reference block.

In the implementation of this application, the video encoder, according to the mode information, obtains the determination result of performing mirror transform on the reference block, and then performs mirror transform on the reference block to obtain the prediction block of the current block.

In an example, after the determination result of performing horizontal mirror transform on the reference block is obtained according to the mode information, the video encoder performs horizontal mirror transform on the reference block to obtain the prediction block of the current block.

In another example, after the determination result of performing vertical mirror transform on the reference block is obtained according to the mode information, the video encoder performs vertical mirror transform on the reference block to obtain the prediction block of the current block.

That is, for screen content coding, the IBC-mirror mode is proposed in the implementations of this application. Based on the translational model of the IBC mode in the related art, functions of "horizontal mirror flipping" and "vertical mirror flipping" are added in the IBC-mirror mode. Thereby, better prediction effect can be achieved, a prediction error can be reduced, and efficiency of video encoding can be improved.

In the prediction method for the current block provided in the implementations of this application, the mode information of the intra block copy-mirror mode is obtained when in the non-merge mode of the intra block copy; whether to perform mirror transform on the reference block is determined according to the mode information; the prediction block of the current block is obtained by performing mirror transform on the reference block when the determination result is performing mirror transform on the reference block. In this way, the current block is predicted by mirror flipping, to achieve a better prediction result, reduce the prediction error, and improve the efficiency of video encoding.

Figure 6:
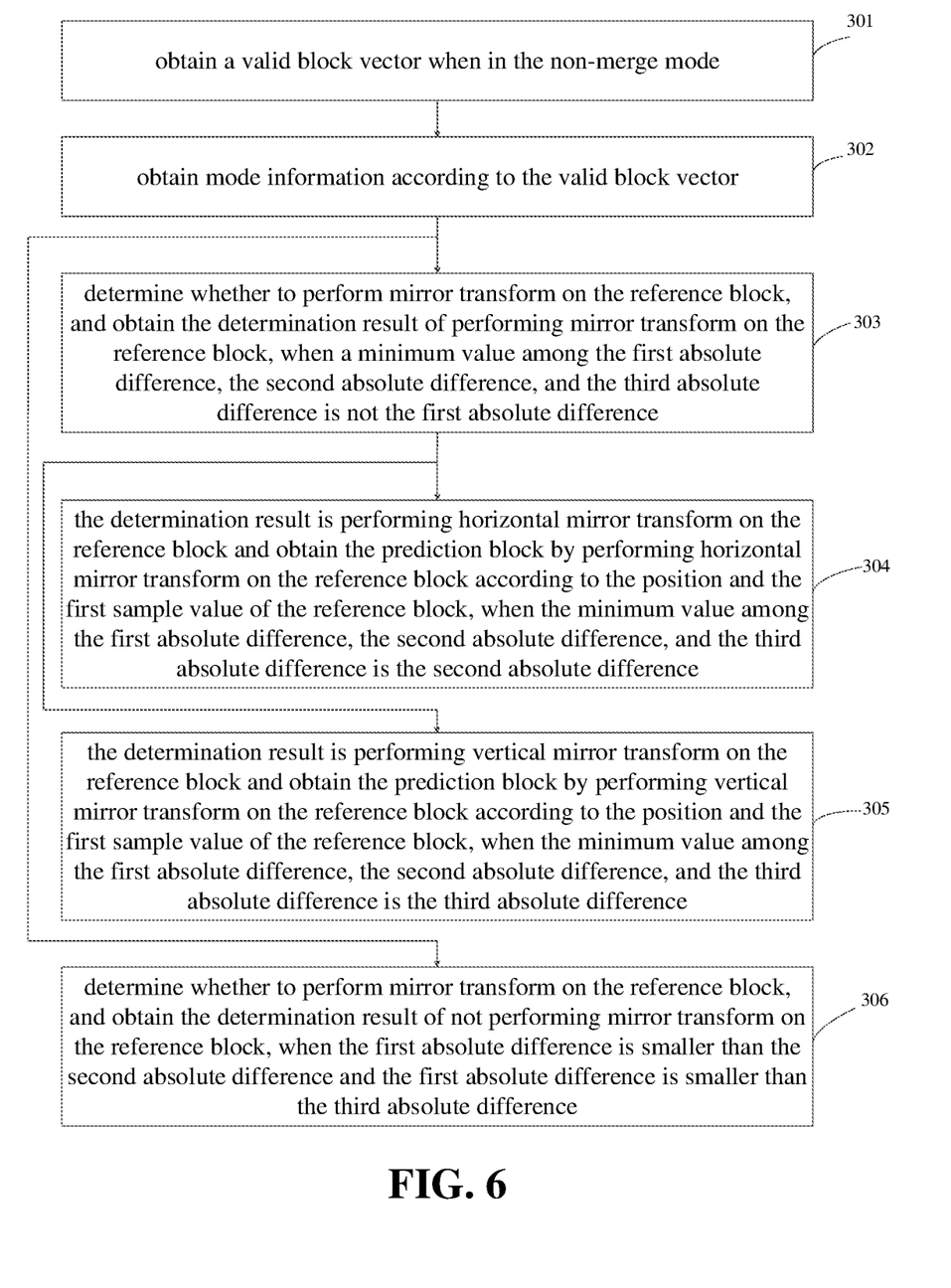
FIG. 6 is a schematic diagram of an implementation procedure of another prediction method for a current block provided in implementations of this application.

Based on the above, implementations of this application provide a prediction method for a current block, applicable to a video encoder. As illustrated in FIG. 6, the method includes the following steps.

Step 301, a valid block vector is obtained when in the non-merge mode.

The valid block vector represents that a reference block referenced by a current block is in a valid encoded reference region.

In the implementation of this application, when the video encoder determines that it is in a non-merge mode, it acquires the valid BV. In the video encoder, that is, an encoding end, the determination of an IBC-mirror mode is performed only in the non-merge mode of IBC. After the non-merge mode of IBC is entered, the global Hash-based search of IBC is first performed according to the original procedure. If no valid BV is found in the Hash-based search, that is, BV=(0,0), proceed to the next BV search procedure of the IBC mode and the determination procedure of the proposed IBC-mirror mode. Otherwise, skip the subsequent BV search procedure of the IBC mode and the determination procedure of the proposed IBC-mirror mode.

Exemplarily, in the IBC mode, each time a valid BV=(x, y) is found for the current coding block (with size of W*H), that is, the BV at this time is not equal to (0,0), it is indicated that the reference block referenced by the current block is in the valid encoded reference region.

Step 302, mode information is obtained according to the valid block vector.

Herein, the mode information may be referred to as mode information of the IBC-mirror mode.

In the implementation of this application, step 302 that the mode information is obtained according to the valid block vector can be implemented by the following steps.

Step 302*a*, a first sample value of the reference block is obtained according to the valid block vector.

In the implementation of this application, the video encoder obtains, according to the valid BV, the first sample value of the reference block, that is, internal sample information of the reference block. Herein, PredBuf is used to represent the first sample value of the reference block, and PredBuf can be understood as a W*H matrix that stores a sample value of each corresponding position of the reference block.

Step 302*b*, a predicted first sample value of the current block is obtained.

In the implementation of this application, assume that the sample value of the current coding block is OrgBuf, and use OrgBuf to represent the first sample value of the current block, where OrgBuf can be understood as a W*H matrix, which stores a sample value of each corresponding position of the current coding block.

Step 302*c*, a first absolute difference between the first sample value of the current block and the first sample value of the reference block is determined.

In the implementation of this application, in the case that OrgBuf and PredBuf are obtained, the video encoder calculates an absolute difference between OrgBuf and PredBuf. Exemplarily, the absolute difference between OrgBuf and PredBuf can be calculated using SAD. Currently, the absolute difference between OrgBuf and PredBuf can also be calculated using other algorithms, such as using the sum of squared difference (SSD) algorithm to calculate the absolute difference between OrgBuf and PredBuf. Herein, the first absolute difference is represented by SAD_org.

Step 302*d*, the mode information is determined according to the first absolute difference.

In the implementation of this application, step 302*d* that the mode information is determined according to the first absolute difference can be implemented by the following steps.

Step 1, a position of the reference block is obtained according to the valid block vector.

Herein, the video encoder obtains the position of the reference block according to the valid BV.

Step 2, horizontal mirror flipping is performed on the reference block according to the position.

Step 3, a second sample value of the reference block after horizontal mirror flipping is obtained.

Herein, the video encoder performs horizontal mirror flipping on PredBuf of the reference block according to the above position, and obtains the second sample value of the reference block after horizontal mirror flipping. Herein, the second sample value of the reference block is represented by PredBuf_hor.

Step 4, vertical mirror flipping is performed on the reference block according to the position.

Step 5, a third sample value of the reference block after vertical mirror flipping is obtained.

Herein, the video encoder performs vertical mirror flipping on PredBuf of the reference block according to the above position, and obtains the third sample value of the reference block after vertical mirror flipping. Herein, the third sample value of the reference block is represented by PredBuf_ver.

Step 6, a second absolute difference between the first sample value of the current block and the second sample value is determined.

Herein, the video encoder calculates the second absolute difference between OrgBuf and PredBuf_hor, such as the absolute difference, denoted as SAD_hor.

Step 7, a third absolute difference between the first sample value of the current block and the third sample value is determined.

Herein, the video encoder calculates the third absolute difference between OrgBuf and PredBuf_ver, such as the absolute difference, denoted as SAD_ver.

Step 8, the mode information is determined according to the first absolute difference, the second absolute difference, and the third absolute difference.

Herein, when SAD_org, SAD_hor, and SAD_ver are obtained, the video encoder determines the mode information according to SAD_org, SAD_hor, and SAD_ver.

In the implementation of this application, after step 302 that the mode information is obtained according to the valid block vector, steps 303 and 304 can be executed, or steps 303 and 305 can be executed, or step 306 can be executed.

Step 303, whether to perform mirror transform on the reference block is determined, and the determination result of performing mirror transform on the reference block is obtained, when a minimum value among the first absolute difference, the second absolute difference, and the third absolute difference is not the first absolute difference.

Herein, the video encoder determines whether to perform mirror transform on the reference block, and obtains the determination result of performing mirror transform on the reference block, when it determines according to SAD_org, SAD_hor, and SAD_ver that a minimum value among the first absolute difference, the second absolute difference, and the third absolute difference is not the first absolute difference.

Step 304, the determination result is performing horizontal mirror transform on the reference block and the prediction block is obtained by performing horizontal mirror transform on the reference block according to the position and the first sample value of the reference block, when the minimum value among the first absolute difference, the second absolute difference, and the third absolute difference is the second absolute difference.

Figure 7:
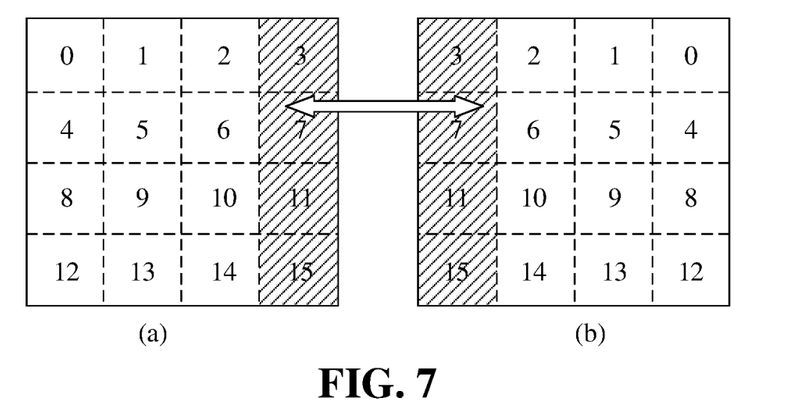
FIG. 7 is a schematic diagram of horizontal mirror flipping provided in implementations of this application.

Furthermore, when the video encoder determines according to SAD_org, SAD_hor, and SAD_ver that the minimum value among the first absolute difference, the second absolute difference, and the third absolute difference is SAD_hor, the determination result is to perform horizontal mirror transform on the reference block, and the video encoder performs horizontal mirror transform on the reference block according to the position and the first sample value of the reference block to obtain the prediction block. Herein, when the "horizontal mirror flipping" is determined, the correspondence relationship between the coding block and the reference block is illustrated in FIG. 7(a) and FIG. 7(b).

In other implementations of this application, the following step is further executed. A parameter obtained by performing horizontal mirror transform on the reference block is encoded according to the position and the first sample value of the reference block and the encoded parameter is signalled into a bitstream.

Step 305, the determination result is performing vertical mirror transform on the reference block and the prediction block is obtained by performing vertical mirror transform on the reference block according to the position and the first sample value of the reference block, when the minimum value among the first absolute difference, the second absolute difference, and the third absolute difference is the third absolute difference.

Figure 8:
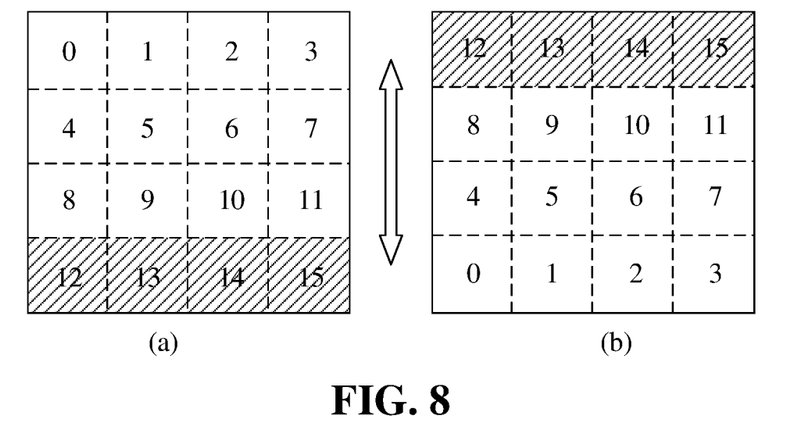
FIG. 8 is a schematic diagram of vertical mirror flipping provided in implementations of this application.

Herein, when the video encoder determines according to SAD_org, SAD_hor, and SAD_ver that the minimum value of the first absolute difference, the second absolute difference, and the third absolute difference is SAD_ver, the determination result is to perform vertical mirror transform on the reference block, and the video encoder performs vertical mirror transform on the reference block according to the position and the first sample value of the reference block to obtain the prediction block. Herein, when the "vertical mirror flipping" is determined, the correspondence relationship between the coding block and the reference block is illustrated in FIG. 8(a) and FIG. 8(b).

Step 306, whether to perform mirror transform on the reference block is determined, and the determination result of not performing mirror transform on the reference block is obtained, when the first absolute difference is smaller than the second absolute difference and the first absolute difference is smaller than the third absolute difference.

Herein, the video encoder determines whether to perform mirror transform on the reference block, and obtains the determination result of not performing mirror transform on the reference block, when it determines according to SAD_org, SAD_hor, and SAD_ver that the minimum value is SAD_org.

In other implementations of this application, the video encoder may also generate a mirror mode flag and a mirror type flag according to a magnitude relationship of the first absolute difference, the second absolute difference, and the third absolute difference, where the mirror mode flag and the mirror type flag are collectively referred to as the mode information.

In other implementations of this application, the following step is further executed. A parameter obtained by performing vertical mirror transform on the reference block is encoded according to the position and the first sample value of the reference block and the encoded parameter is signalled into a bitstream.

Figure 9:
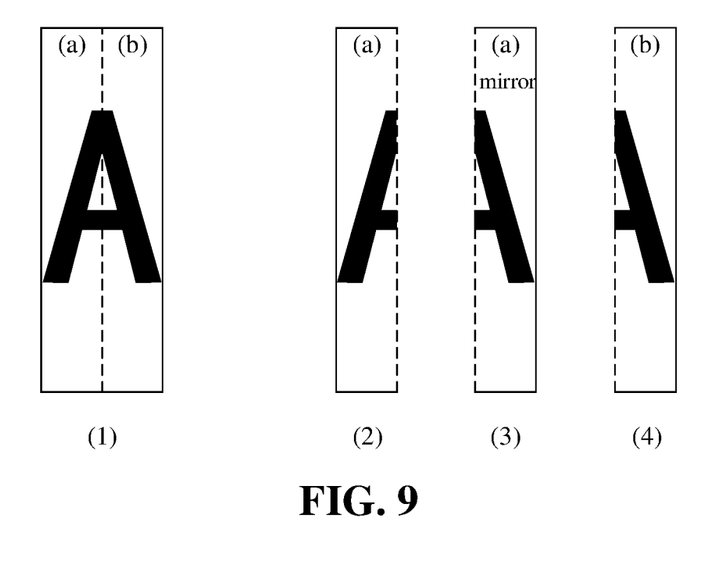
FIG. 9 is a schematic diagram of functioning of an IBC-mirror mode provided in implementations of this application.

As illustrated in FIG. 9(1)-FIG. 9(4), mirror flipping can well solve the problem that: in the process of encoding, due to the complex motion such as mirror flipping, the IBC mode based on the translational motion model cannot make good use of this mirror flipping characteristic for encoding, improving encoding efficiency. 9(1) is a coding block with content of the character "A", which has horizontal mirror characteristic. If the coding block is in the upper left corner of the video sequence (the coding block cannot reference other coding blocks at this time), that is, "A" has not been encoded before, or the distance from other encoded blocks whose content is the character "A" exceeds the reference range, the IBC model cannot work well. However, after the introduction of the IBC-mirror mode, during encoding the right half (b) of the coding block, horizontal mirror flipping can be first performed on the left half (a) corresponding to 9(2) to obtain a picture corresponding to 9(3), and the picture corresponding to 9(3) is used as the reference block of (b) to obtain 9(4). In this way, accuracy of prediction can be significantly improved.

Based on the foregoing implementations, in an example where the absolute difference is calculated by using SAD, the process of applying the prediction method for the current block provided by the implementations of this application to the encoding end (the encoding end corresponds to the video encoder) is further described.

Based on the foregoing contents, it can be known that, the implementations of this application propose the IBC-mirror mode, in the framework of the translational model of the IBC mode in the related art, the functions of "horizontal mirror flipping" and "vertical mirror flipping" are added in the IBC-mirror mode.

In the implementations of this application, two CU-level flags are added to signal this mode. The two flags are transmitted only in the non-merge mode of IBC, otherwise they are defaulted to be "false". One flag is mirrorFlag, where "true" indicates that the CU uses the mirror mode, and "false" indicates that the mirror mode is not used. The other flag is mirrorType, which is transmitted only when mirrorFlag is "true", otherwise mirrorType defaults to be "false", where "true" means using horizontal mirror flipping, and "false" means using vertical mirror flipping. Understandably, the meanings of "true" and "false" can be interchanged, as long as the meanings at the encoding end and a decoding end are unified.

In the encoding end, the determination of the IBC-mirror mode is performed only in the non-merge mode of IBC. After the non-merge mode of IBC is entered, the global Hash-based search of IBC is first performed according to the original procedure. If no valid BV is found in the Hash-based search, that is, BV=(0,0), proceed to the next BV search procedure of the IBC mode and the determination procedure of the proposed IBC-mirror mode. Otherwise, skip the subsequent BV search procedure of the IBC mode and the determination procedure of the proposed IBC-mirror mode.

The determination procedure of the IBC-mirror mode proposed in the implementations of this application refers to the following procedure.

In the IBC mode, after each time a valid BV=(x, y) is found for the current coding block (with size of W*H), the position of the reference block and the internal sample information are first obtained according to BV=(x, y). Assume that the sample value of the current coding block is OrgBuf (a W*H matrix that stores the sample value of each corresponding position of the current coding block), and the sample value of the reference block is PredBuf (a W*H matrix that stores the sample value of each corresponding position of the reference block).

Herein, first, calculate the SAD between OrgBuf and PredBuf, denoted as SAD_org.

Second, perform horizontal mirror flipping on PredBuf according to the manner illustrated in FIG. 7(a) and FIG. 7(b) and store it in PredBuf_hor. Calculate the SAD between OrgBuf and PredBuf_hor, denoted as SAD_hor.

Next, perform vertical mirror flipping on the PredBuf according to the manner illustrated in FIG. 8(a) and FIG. 8(b) and store it in PredBuf_ver. Calculate the SAD between OrgBuf and PredBuf_ver, denoted as SAD_ver.

Again, select the minimum value of SAD_org, SAD_hor, SAD_ver.

Finally, if the minimum value is SAD_org, let mirrorFlag and mirrorType both be "false". At this time, determine not to perform mirror transform on the reference block. If the minimum value is SAD_hor, then let mirrorFlag be "true" and mirrorType be "true". At this time, determine to perform horizontal mirror transform on the reference block. If the minimum value is SAD_ver, then let mirrorFlag be "true" and mirrorType be "false". At this time, determine to perform vertical mirror transform on the reference block.

In other implementations of this application, methods other than SAD may be adopted for calculating the absolute difference, which is not specifically limited in the implementations of this application.

In other implementations of this application, based on the foregoing contents, it can be known that, currently, the determination procedure of the IBC-mirror mode can be performed for blocks of all sizes. But this size can be limited or modified as needed. For example, it is also possible to set performing this determination only for blocks with a size greater than or equal to 16*16. mirrorFlag and mirrorType of other CUs that do not meet the size limit are both "false" by default and do not need to be transmitted.

In other implementations of this application, based on the foregoing content, it can be known that, currently, the determination procedure of the IBC-mirror mode is performed for each valid BV=(x, y) found in the IBC mode. In this implementation, a fast algorithm or a skip algorithm can be designed according to the content characteristics of the video, thereby saving encoding time.

Furthermore, at the end of the BV search procedure in the IBC mode, the BV corresponding to the minimum Rdcost, that is, the optimal BV, as well as mirrorFlag and mirrorType will be obtained. Then, according to the precision requirement, the BV is stored in the PU, and mirrorFlag and mirrorType are stored in CU.mirrorFlag and CU.mirrorType.

Then, motion compensation is performed according to the video encoding procedure. During motion compensation, the position of the reference block and the internal sample information are obtained according to the optimal BV=(x, y) obtained in the above steps. Then, based on the two flags CU.mirrorFlag and CU.mirrorType, determine whether to perform transform on the reference block. If CU.mirrorFlag and CU.mirrorType are both "false", do not transform. If both CU.mirrorFlag and CU.mirrorType are "true", horizontal mirror flipping is performed on the reference block. If CU.mirrorFlag is "true" and CU.mirrorType is "false", vertical mirror flipping is performed on the reference block. The subsequent procedure is consistent with the original encoding procedure, and will not be repeated herein.

It should be noted that, the mirror mode can not only be used in screen content coding (that is, embedded in the IBC mode), but also in the inter coding procedure of the normal sequence. Similarly, after each valid MV=(x, y) is found for the current coding block in the inter coding, a similar determination procedure of the IBC-mirror mode can be performed, that is, the position of the reference block and the internal sample information are obtained according to the MV. Calculate SAD_org. Then, perform horizontal mirror flipping and calculate SAD_hor, and perform vertical mirror flipping and calculate SAD_ver. Select the minimum value of SAD_org, SAD_hor, and SAD_ver, and assign values to mirrorFlag and mirrorType accordingly. The subsequent motion compensation process is also similar, that is, corresponding mirror flipping can be performed on the reference block according to the two CU-level flags.

Figure 10:
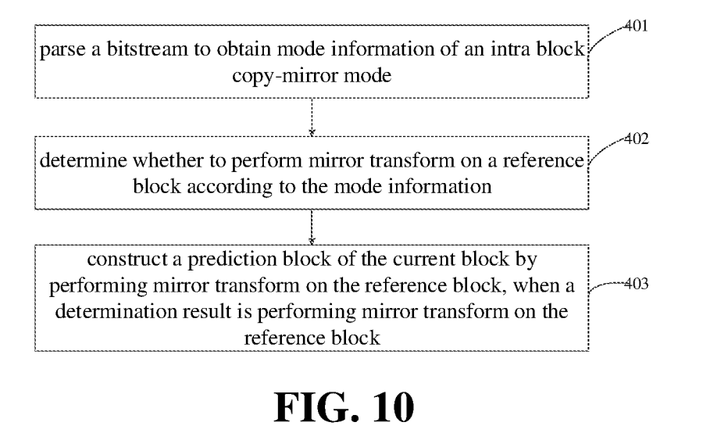
FIG. 10 is a schematic diagram of an implementation procedure of a prediction method for a current block provided in another implementation of this application.

Based on the above, implementations of this application provide a prediction method for a current block, applicable to a video decoder. As illustrated in FIG. 10, the method includes the following steps.

Step 401, a bitstream is parsed to obtain mode information of an intra block copy-mirror mode.

In the implementations of this application, the video decoder, i.e., a decoding end parses the bitstream to obtain the mode information of the intra block copy-mirror mode. Herein, the mode information includes two flags CU.mirrorFlag and CU.mirrorType.

Step 402, whether to perform mirror transform on a reference block is determined according to the mode information.

In the implementations of this application, when the video decoder obtains CU.mirrorFlag and CU.mirrorType, it determines whether to perform minor transform on the reference block according to CU.mirrorFlag and CU.mirrorType, and determines which mirror transform to perform when mirror transform is performed on the reference block.

In the implementations of this application, the reference block is located in a current picture where the current block is located, or the reference block is located in a decoded picture before the current picture is decoded.

Step 403, a prediction block of the current block is constructed by performing minor transform on the reference block, when a determination result is performing minor transform on the reference block.

In the implementations of this application, when the determination result of performing minor transform on the reference block is obtained according to CU.mirrorFlag and CU.mirrorType, the video decoder performs mirror transform on the reference block to construct the prediction block of the current block.

In the prediction method for the current block provided in the implementations of this application, the bitstream is parsed to obtain the mode information of the intra block copy-mirror mode; whether to perform mirror transform on the reference block is determined according to the mode information; the prediction block of the current block is constructed by performing mirror transform on the reference block, when the determination result is performing minor transform on the reference block. In this way, the prediction block of the current block can be obtained through fast decoding, which improves decoding efficiency and decoding accuracy.

Figure 11:
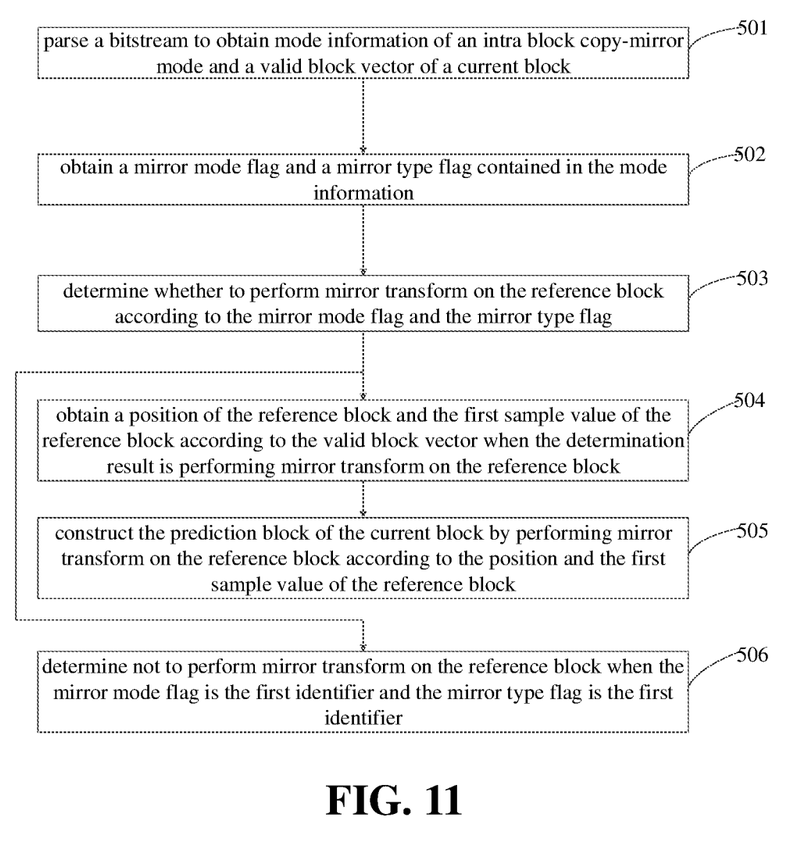
FIG. 11 is a schematic diagram of an implementation procedure of another prediction method for a current block provided in another implementation of this application.

Based on the above, implementations of this application provide a prediction method for a current block, applicable to a video decoder. As illustrated in FIG. 11, the method includes the following steps.

Step 501, a bitstream is parsed to obtain mode information of an intra block copy-mirror mode and a valid block vector of a current block.

In the implementations of this application, the video decoder parses the bitstream to obtain the mode information of the intra block copy-mirror mode and the valid block vector of the current block.

Step 502, a mirror mode flag and a mirror type flag contained in the mode information are obtained.

Herein, the mirror mode flag is denoted by CU.mirrorFlag and the mirror type flag is denoted by CU.mirrorType.

The mirror mode flag and the mirror type flag are obtained by a video encoder based on a magnitude relationship of a first absolute difference, a second absolute difference, and a third absolute difference.

The first absolute difference is an absolute difference between a first sample value of the current block and a first sample value of a reference block determined by the video encoder, the second absolute difference is an absolute difference between the first sample value of the current block and a second sample value of the reference block determined by the video encoder, and the third absolute difference is an absolute difference between the first sample value of the current block and a third sample value of the reference block determined by the video encoder.

Step 503, whether to perform mirror transform on the reference block is determined according to the mirror mode flag and the mirror type flag.

In the implementations of this application, step 503 that whether to perform mirror transform on the reference block is determined according to the mirror mode flag and the mirror type flag can be implemented by the following steps.

Step 503a, determine to perform horizontal mirror transform on the reference block and the determination result is obtained, when the mirror mode flag is a second identifier and the mirror type flag is the second identifier.

In the implementations of this application, when the video decoder determines that both CU.mirrorFlag and CU.mirrorType are "true", it determines to perform horizontal mirror transform on the reference block, and obtains the determination result. Furthermore, during mirror transform, step 505a is performed accordingly.

Step 503b, determine to perform vertical mirror transform on the reference block and the determination result is obtained, when the mirror mode flag is the second identifier and the mirror type flag is a first identifier.

In the implementations of this application, when the video decoder determines that CU.mirrorFlag is "true" and CU.mirrorType is "false", it determines to perform vertical mirror transform on the reference block and obtain the determination result. Furthermore, during mirror transform, step 505b is performed accordingly.

Step 504, a position of the reference block and the first sample value of the reference block are obtained according to the valid block vector when the determination result is performing mirror transform on the reference block.

In the implementations of this application, after decoding to obtain the valid BV, the video decoder performs motion compensation. During motion compensation, the video decoder obtains the position of the reference block and the first sample value of the reference block according to the valid BV.

Step 505, the prediction block of the current block is constructed by performing mirror transform on the reference block according to the position and the first sample value of the reference block.

In the implementations of this application, step 505 that the prediction block of the current block is constructed by performing mirror transform on the reference block according to the position and the first sample value of the reference block can be implemented by the following steps.

Step 505a, the prediction block of the current block is constructed by performing horizontal mirror transform on the reference block according to the position and the first sample value of the reference block.

Step 505b, the prediction block of the current block is constructed by performing vertical mirror transform on the reference block according to the position and the first sample value of the reference block Step 506, determine not to perform mirror transform on the reference block when the mirror mode flag is the first identifier and the mirror type flag is the first identifier.

In the implementations of this application, the video decoder determines that both CU.mirrorFlag and CU.mirrorType are "false", and determines not to perform mirror transform on the reference block.

Based on the foregoing implementations, the process of applying the prediction method for the current block provided by the implementations of this application to the decoding end (the decoding end corresponds to the video decoder) is further described.

The decoder decodes to obtain the BV of the current coding block and the two flags CU.mirrorFlag and CU.mirrorType. Then, motion compensation is performed. During motion compensation, the position of the reference block and the internal sample information are obtained according to the BV=(x, y). Then, based on the two flags CU.mirrorFlag and CU.mirrorType, determine whether to perform transform on the reference block. If CU.mirrorFlag and CU.mirrorType are both "false", do not transform. If both CU.mirrorFlag and CU.mirrorType are "true", horizontal mirror flipping is performed on the reference block. If CU.mirrorFlag is "true" and CU.mirrorType is "false", vertical mirror flipping is performed on the reference block.

Figure 12:
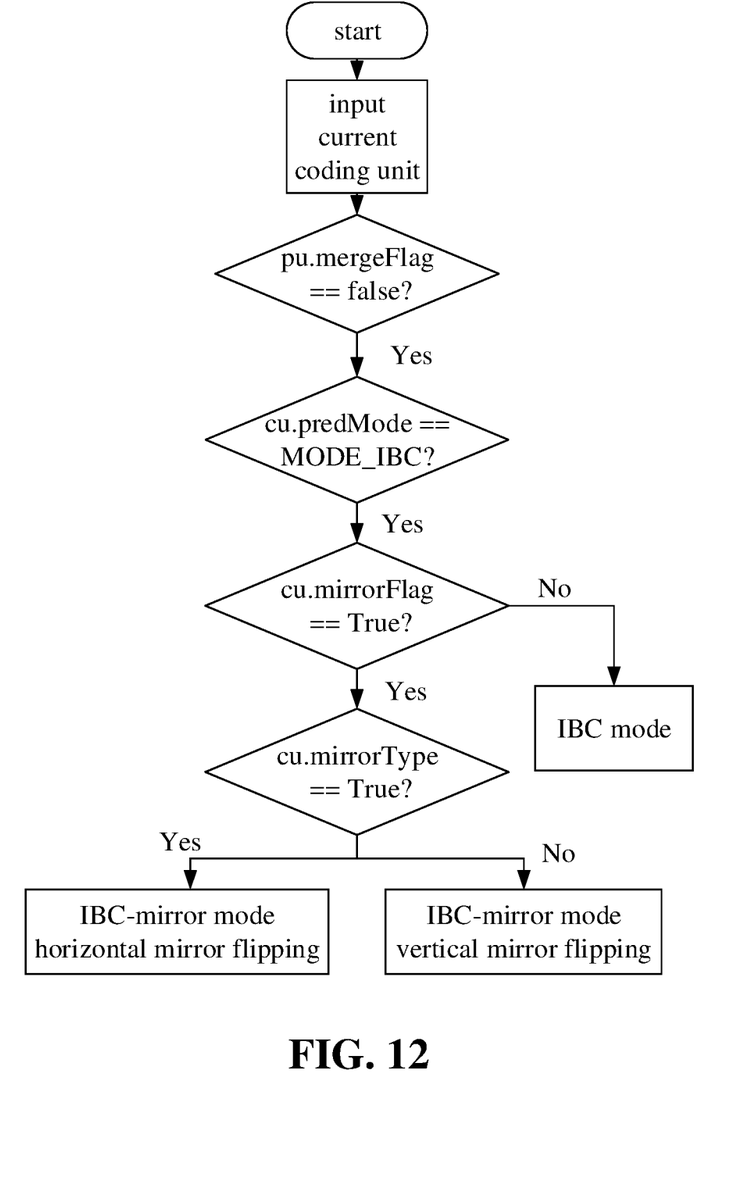
FIG. 12 is a schematic diagram of an inference procedure of an IBC-mirror mode provided in implementations of this application.

In other implementations of this application, an inference procedure of the IBC-mirror mode is further described and reference is made to FIG. 12.

As described above, the two CU-level flags (CU.mirrorFlag and CU.mirrorType) are set to signal the IBC-mirror mode. The two flags are transmitted only in the non-merge mode of IBC (cu.predMode==MODE_IBC, and pu.mergeFlag==false), otherwise they are "false" by default. One flag is CU.mirrorFlag, where "true" indicates that the CU uses the mirror mode, and "false" indicates that the mirror mode is not used. The other flag is mirrorType, which is transmitted only when mirrorFlag is "true", otherwise it defaults to be "false", where "true" means using horizontal mirror flipping, and "false" means using vertical mirror flipping. Understandably, the meanings of "true" and "false" can be interchanged, as long as the meanings at an encoding end and the decoding end are unified.

The implementations of this application can achieve the following advantageous effects.

1) For screen content coding, based on the translational model of the IBC mode in the related art, functions of "horizontal mirror flipping" and "vertical mirror flipping" are added in the IBC-mirror mode. Thereby, better prediction effect can be achieved, the prediction error can be reduced, and the efficiency of video encoding can be improved.

2) The prediction method for the current block provided in the implementations of this application can be used in common scenarios of screen content coding, such as document online sharing, game live broadcast, remote desktop, online game, etc., and has a good application prospect.

Based on the foregoing implementations, the implementations of this application provide a prediction apparatus for a current block. Various modules included in the apparatus may be implemented by a processor in an electronic device. Certainly, they can also be implemented by a specific logic circuit. In the implementation process, the processor may be a central processing unit (CPU), a microprocessor unit (MPU), a digital signal processor (DSP), a field programmable gate array (FPGA), or the like.

Figure 13:
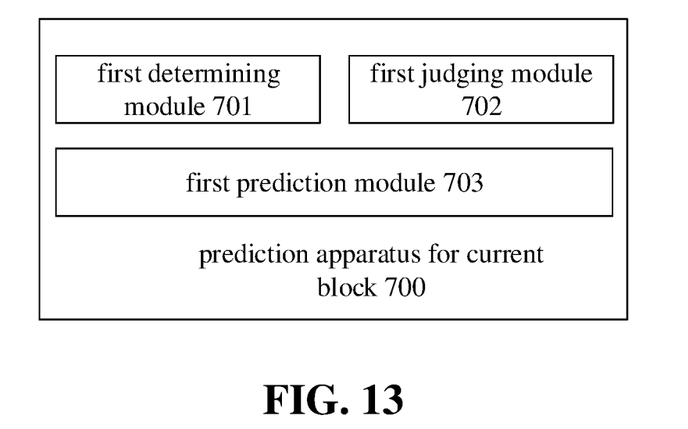
FIG. 13 is a schematic structural diagram of a structure of a prediction apparatus for a current block provided in implementations of this application.

FIG. 13 is a schematic structural diagram of a structure of a prediction apparatus for a current block of implementations of this application. As illustrated in FIG. 13, the prediction apparatus 700 (the prediction apparatus 700 corresponds to the above video encoder) includes a first determining module 701, a first judging module 702, and a first prediction module 703.

The first determining module 701 is configured to obtain mode information of an intra block copy-mirror mode when in a non-merge mode of intra block copy.

The first judging module 702 is configured to determine whether to perform mirror transform on a reference block according to the mode information.

The first prediction module 703 is configured to obtain a prediction block of the current block by performing mirror transform on the reference block when a determination result is performing mirror transform on the reference block.

In other implementations, the first determining module 701 is configured to: obtain a valid block vector when in the non-merge mode, where the valid block vector represents that the reference block referenced by the current block is in a valid encoded reference region; and obtain the mode information according to the valid block vector.

In other implementations, the first determining module 701 is configured to: obtain a first sample value of the reference block according to the valid block vector; obtain a predicted first sample value of the current block; determine a first absolute difference between the first sample value of the current block and the first sample value of the reference block; and determine the mode information according to the first absolute difference.

In other implementations, the first determining module 701 is configured to: obtain a position of the reference block according to the valid block vector; perform horizontal mirror flipping on the reference block according to the position; obtain a second sample value of the reference block after horizontal mirror flipping; perform vertical mirror flipping on the reference block according to the position; obtain a third sample value of the reference block after vertical mirror flipping; determine a second absolute difference between the first sample value of the current block and the second sample value; determine a third absolute difference between the first sample value of the current block and the third sample value; and determine the mode information according to the first absolute difference, the second absolute difference, and the third absolute difference.

In other implementations, the first judging module 702 is configured to: determine whether to perform mirror transform on the reference block, and obtain the determination result of performing mirror transform on the reference block, when a minimum value among the first absolute difference, the second absolute difference, and the third absolute difference is not the first absolute difference.

In other implementations, the first judging module 702 is configured to: determine whether to perform mirror transform on the reference block, and obtaining the determination result of not performing mirror transform on the reference block, when the first absolute difference is smaller than the second absolute difference and the first absolute difference is smaller than the third absolute difference.

In other implementations, the first prediction module 703 is configured to: the determination result being performing horizontal mirror transform on the reference block, obtain the prediction block by performing horizontal mirror transform on the reference block according to the position and the first sample value of the reference block, when the minimum value among the first absolute difference, the second absolute difference, and the third absolute difference is the second absolute difference.

In other implementations, the first prediction module 703 is configured to: the determination result being performing vertical mirror transform on the reference block, obtain the prediction block by performing vertical mirror transform on the reference block according to the position and the first sample value of the reference block, when the minimum value among the first absolute difference, the second absolute difference, and the third absolute difference is the third absolute difference.

In other implementations, the prediction apparatus 700 further includes a first processing module configured to encode, according to the position and the first sample value of the reference block, a parameter obtained by performing horizontal mirror transform on the reference block and signal the encoded parameter into a bitstream.

In other implementations, the first processing module is configured to encode, according to the position and the first sample value of the reference block, a parameter obtained by performing vertical mirror transform on the reference block and signal the encoded parameter into a bitstream.

In other implementations, the reference block is located in a current picture where the current block is located, or the reference block is located in an encoded picture before the current picture is encoded.

Figure 14:
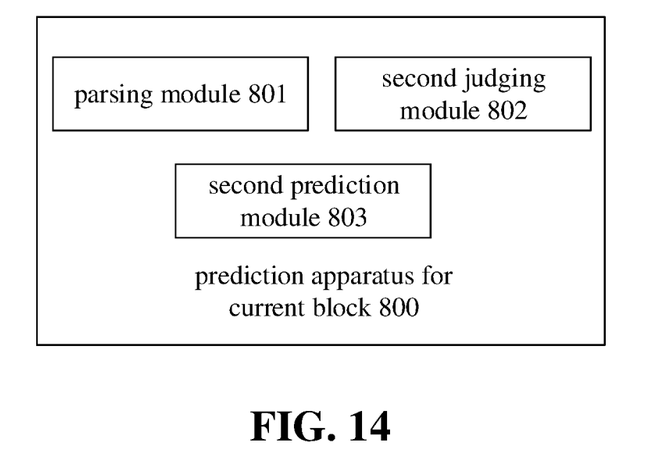
FIG. 14 is a schematic structural diagram of a structure of a prediction apparatus for a current block provided in another implementation of this application.

FIG. 14 is a schematic structural diagram of a structure of a prediction apparatus for a current block of another implementation of this application. As illustrated in FIG. 14, the prediction apparatus 800 (the prediction apparatus 800 corresponds to the above video decoder) includes a parsing module 801, a second judging module 802, and a second prediction module 803.

The parsing module 801 is configured to parse a bitstream to obtain mode information of an intra block copy-mirror mode.

The second judging module 802 is configured to determine whether to perform mirror transform on a reference block according to the mode information.

The second prediction module 803 is configured to construct a prediction block of the current block by performing mirror transform on the reference block when a determination result is performing mirror transform on the reference block.

In other implementations, the second judging module 802 is configured to: obtain a mirror mode flag and a mirror type flag contained in the mode information, where the mirror mode flag and the mirror type flag are obtained by a video encoder based on a magnitude relationship of a first absolute difference, a second absolute difference, and a third absolute difference, and where the first absolute difference is an absolute difference between a first sample value of the current block and a first sample value of the reference block determined by the video encoder, the second absolute difference is an absolute difference between the first sample value of the current block and a second sample value of the reference block determined by the video encoder, and the third absolute difference is an absolute difference between the first sample value of the current block and a third sample value of the reference block determined by the video encoder; and determine whether to perform mirror transform on the reference block according to the mirror mode flag and the mirror type flag.

In other implementations, the parsing module 801 is configured to obtain a valid block vector of the current block during parsing the bitstream.

In other implementations, the second prediction module 803 is configured to: obtain a position of the reference block and the first sample value of the reference block according to the valid block vector when the determination result is performing mirror transform on the reference block; and construct the prediction block of the current block by performing mirror transform on the reference block according to the position and the first sample value of the reference block.

In other implementations, the second judging module 802 is configured to determine to perform horizontal mirror transform on the reference block and obtain the determination result, when the mirror mode flag is a second identifier and the mirror type flag is the second identifier.

In other implementations, the second prediction module 803 is configured to: construct the prediction block of the current block by performing horizontal mirror transform on the reference block according to the position and the first sample value of the reference block.

In other implementations, the second judging module 802 is configured to: determine to perform vertical mirror transform on the reference block and obtain the determination result, when the mirror mode flag is a second identifier and the mirror type flag is a first identifier.

In other implementations, the second prediction module 803 is configured to construct the prediction block of the current block by performing vertical mirror transform on the reference block according to the position and the first sample value of the reference block.

In other implementations, the second judging module 802 is configured to determine not to perform mirror transform on the reference block when the mirror mode flag is a first identifier and the mirror type flag is the first identifier.

In other implementations, the reference block is located in a current picture where the current block is located, or the reference block is located in a decoded picture before the current picture is decoded.

The descriptions of the above apparatus implementations are similar to the descriptions of the above method implementations, and the above apparatus implementations have similar advantageous effects to the method implementations. For technical details not disclosed in the apparatus implementations of this application, please refer to the descriptions of the method implementations of this application for understanding.

It should be noted that, in the implementations of this application, if the above prediction method for the current block are implemented as software functional units and sold or used as standalone products, they may be stored in a computer readable storage medium. Based on such understanding, the essential technical solution, or the portion that contributes to the related art, or all or part of the technical solution of the implementations of this application may be embodied as software products. The computer software product is stored in a storage medium and includes several instructions to cause an electronic device (which may be a mobile phone, a tablet computer, a desktop computer, a server, a television, an audio player, etc.) to execute some or all steps of the methods described in various implementations. The above storage medium may include various kinds of media that can store program codes, such as a universal serial bus (USB) flash disk, a mobile hard drive, a read only memory (ROM), a magnetic disk, or an optical disk. As such, the implementations of this application are not limited to any specific combination of hardware and software.

Figure 15:
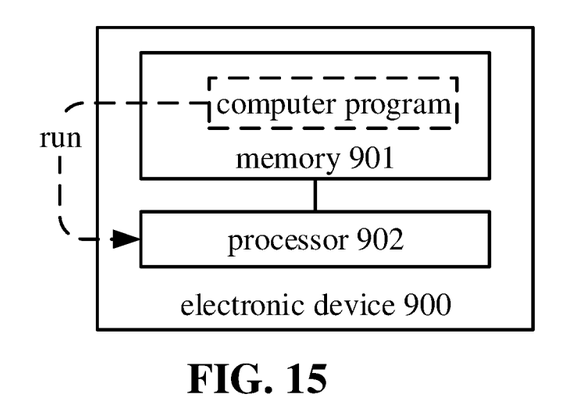
FIG. 15 is a schematic diagram of a hardware entity of an electronic device of implementations of this application.

Accordingly, implementations of this application provide an electronic device. FIG. 15 is a schematic diagram of a hardware entity of an electronic device provided in implementations of this application. As illustrated in FIG. 15, the electronic device 900 includes a memory 901 and at least one processor (e.g., a processor 902). The memory 901 stores at least one computer executable instruction (e.g., a computer program) executable on the processor 902, and the processor 902 executes the program to implement steps in the prediction method for the current block provided in the above implementations.

It should be noted that, the memory 901 is configured to store instructions and applications executable by the processor 902, and further to cache data to be processed or processed (for example, picture data, audio data, voice communication data, and video communication data) by the processor 902 and various modules in the electronic device 900, which can be implemented through FLASH or random access memory (RAM).

Accordingly, implementations of this application provide a computer-readable storage medium. The computer-readable storage medium stores a computer program thereon. When executed by a processor, the computer program implements steps in the prediction method for the current block provided in the above implementations.

Herein, it should be noted that: the descriptions of the above storage medium and apparatus implementations are similar to the descriptions of the above method implementations, and the above storage medium and apparatus implementations have similar advantageous effects to the method implementations. For technical details not disclosed in the storage medium and apparatus implementations of this application, please refer to the descriptions of the method implementations of this application for understanding.

It is to be understood that, "one implementation" or "an implementation" throughout the specification means that a particular feature, structure, or characteristic associated with the implementation is included in at least one implementation of this application. Thus, "in one implementation" or "in an implementation" appearing in various places throughout the specification does not necessarily refer to the same implementation. Furthermore, the particular features, structures, or characteristics may be combined in any suitable manner in one or more implementations. It should be understood that, in various implementations of this application, the magnitude of the sequence numbers of the above processes does not mean the order of execution. The order of execution of each process should be determined by its function and internal logic, and should not constitute any limitation to the implementation process of the implementations of this application. The serial numbers of the foregoing implementations of this application are only for description, and do not represent the superiority of the implementations of this application.

It is noted that in this application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including one . . . " does not exclude the existence of other same elements in the process, method, article, or device that includes the element.

In some implementations of this application, it should be understood that, the device/apparatus and method disclosed in implementations provided herein may be implemented in other manners. For example, the device implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of this application may be integrated into one processing unit, or each unit may be physically present, or two or more units may be integrated into one unit. The abovementioned integrated unit can be implemented in the form of hardware or a software function unit, or combination thereof.

It will be understood by those of ordinary skill in the art that, all or a part of the various methods of the implementations described above may be accomplished by means of a program to instruct associated hardware. The program may be stored in a computer readable storage medium. When executed, the program executes steps including the above method implementations. The aforementioned storage medium includes: a mobile storage device, an ROM, a magnetic disk or an optical disk and other mediums that can store program codes.

Alternatively, the integrated unit may be stored in a computer readable storage when it is implemented in the form of a software functional unit and is sold or used as a separate product. Based on such understanding, the technical solutions of this application essentially, or the part of the technical solutions that contributes to the related art, or all or part of the technical solutions, may be embodied in the form of a software product. The computer software product is stored in a memory and includes instructions for causing a computer device (which may be a cell phone, tablet, desktop, server, television, audio player, etc.) to perform all or part of the steps described in the various implementations of this application. The memory includes various medium capable of storing program codes, such as a USB flash disk, an ROM, an RAM, a removable hard disk, disk, compact disc, or the like. The aforementioned storage medium includes: a mobile storage device, an ROM, a magnetic disk or an optical disk and other mediums that can store program codes.

The methods disclosed in the several method implementations of this application can be combined without conflict to obtain new method implementations.

The features disclosed in the several product implementations of this application can be combined without conflict to obtain new product implementations.

The features disclosed in the several method implementations or device implementations of this application can be combined without conflict to obtain new method implementations or device implementations.

The above are some implementations of this application, but the protection scope of this application is not limited thereto. Any changes or substitutions that can be easily conceived by those skilled in the art within the technical scope disclosed by this application should be covered by the protection scope of this application. Therefore, the protection scope of this application should be subject to the protection scope of the claims.

INDUSTRIAL APPLICABILITY

In the implementations of this application, the mode information of the intra block copy-mirror mode is obtained when in the non-merge mode of the intra block copy; whether to perform mirror transform on the reference block is determined according to the mode information, the prediction block of the current block is obtained by performing mirror transform on the reference block when the determination result is performing mirror transform on the reference block. In this way, the current block is predicted by mirror flipping, to achieve the better prediction result, reduce the prediction error, and improve the efficiency of video encoding.

What is claimed is:

1. A method of predicting a current block for a video encoder, the method comprising:
   obtaining mode information of an intra block copy-minor mode when in a non-merge mode of intra block copy;
   determining whether to perform minor transform on a reference block according to the mode information; and
   obtaining a prediction block of the current block by performing mirror transform on the reference block when a determination result is performing mirror transform on the reference block.

2. The method of claim 1, wherein obtaining the mode information of the intra block copy-minor mode when in the non-merge mode of the intra block copy comprises:
obtaining a valid block vector when in the non-merge mode, wherein the valid block vector represents that the reference block referenced by the current block is in a valid encoded reference region; and
obtaining the mode information according to the valid block vector.

3. The method of claim 2, wherein obtaining the mode information according to the valid block vector comprises:
obtaining a first sample value of the reference block according to the valid block vector;
obtaining a predicted first sample value of the current block;
determining a first absolute difference between the first sample value of the current block and the first sample value of the reference block; and
determining the mode information according to the first absolute difference.

4. The method of claim 3, wherein determining the mode information according to the first absolute difference comprises:
obtaining a position of the reference block according to the valid block vector;
performing horizontal mirror flipping on the reference block according to the position;
obtaining a second sample value of the reference block after horizontal mirror flipping;
performing vertical mirror flipping on the reference block according to the position;
obtaining a third sample value of the reference block after vertical mirror flipping;
determining a second absolute difference between the first sample value of the current block and the second sample value;
determining a third absolute difference between the first sample value of the current block and the third sample value; and
determining the mode information according to the first absolute difference, the second absolute difference, and the third absolute difference.

5. The method of claim 4, wherein determining whether to perform mirror transform on the reference block according to the mode information comprises:
determining whether to perform minor transform on the reference block, and obtaining the determination result of performing minor transform on the reference block, when a minimum value among the first absolute difference, the second absolute difference, and the third absolute difference is not the first absolute difference.

6. The method of claim 4, wherein determining whether to perform mirror transform on the reference block according to the mode information comprises:
determining whether to perform minor transform on the reference block, and obtaining the determination result of not performing minor transform on the reference block, when the first absolute difference is smaller than the second absolute difference and the first absolute difference is smaller than the third absolute difference.

7. The method of claim 5, wherein obtaining the prediction block of the current block by performing mirror transform on the reference block when the determination result is performing minor transform on the reference block comprises:
the determination result being performing horizontal minor transform on the reference block and obtaining the prediction block by performing horizontal mirror transform on the reference block according to the position and the first sample value of the reference block, when the minimum value among the first absolute difference, the second absolute difference, and the third absolute difference is the second absolute difference.

8. The method of claim 5, wherein obtaining the prediction block of the current block by performing mirror transform on the reference block when the determination result is performing minor transform on the reference block comprises:
the determination result being performing vertical minor transform on the reference block and obtaining the prediction block by performing vertical mirror transform on the reference block according to the position and the first sample value of the reference block, when the minimum value among the first absolute difference, the second absolute difference, and the third absolute difference is the third absolute difference.

9. The method of claim 7, further comprising:
encoding, according to the position and the first sample value of the reference block, a parameter obtained by performing horizontal minor transform on the reference block and signalling the encoded parameter into a bitstream.

10. The method of claim 8, further comprising:
encoding, according to the position and the first sample value of the reference block, a parameter obtained by performing vertical minor transform on the reference block and signalling the encoded parameter into a bitstream.

11. The method of claim 1, wherein the reference block is located in a current picture where the current block is located, or the reference block is located in an encoded picture before the current picture is encoded.

12. A method of predicting a current block for a video decoder, the method comprising:
parsing a bitstream to obtain mode information of an intra block copy-mirror mode when in a non-merge mode of intra block copy;
determining whether to perform minor transform on a reference block according to the mode information; and
constructing a prediction block of the current block by performing minor transform on the reference block, when a determination result is performing mirror transform on the reference block.

13. The method of claim 12, wherein determining whether to perform mirror transform on the reference block according to the mode information comprises:
obtaining a minor mode flag and a minor type flag contained in the mode information, wherein the mirror mode flag and the minor type flag are obtained by a video encoder based on a magnitude relationship of a first absolute difference, a second absolute difference, and a third absolute difference, wherein
the first absolute difference is an absolute difference between a first sample value of the current block and a first sample value of the reference block determined by the video encoder, the second absolute difference is an absolute difference between the first sample value of the current block and a second sample value of the reference block determined by the video encoder, and the third absolute difference is an absolute difference between the first sample value of the current block and a third sample value of the reference block determined by the video encoder; and determining whether to perform minor transform on the reference block according to the minor mode flag and the mirror type flag.

14. The method of claim 13, wherein
the method further comprises: obtaining a valid block vector of the current block during parsing the bitstream; and
accordingly, constructing the prediction block of the current block by performing mirror transform on the reference block when the determination result is performing mirror transform on the reference block comprises:
obtaining a position of the reference block and the first sample value of the reference block according to the valid block vector when the determination result is performing mirror transform on the reference block; and
constructing the prediction block of the current block by performing mirror transform on the reference block according to the position and the first sample value of the reference block.

15. The method of claim 14, wherein
determining whether to perform minor transform on the reference block according to the minor mode flag and the mirror type flag comprises:
determining to perform horizontal minor transform on the reference block and obtaining the determination result, when the minor mode flag is a second identifier and the mirror type flag is the second identifier; and
accordingly, constructing the prediction block of the current block by performing mirror transform on the reference block according to the position and the first sample value of the reference block comprises:
constructing the prediction block of the current block by performing horizontal minor transform on the reference block according to the position and the first sample value of the reference block.

16. The method of claim 14, wherein
determining whether to perform minor transform on the reference block according to the minor mode flag and the mirror type flag comprises:
determining to perform vertical minor transform on the reference block and obtaining the determination result, when the minor mode flag is a second identifier and the mirror type flag is a first identifier; and
accordingly, constructing the prediction block of the current block by performing mirror transform on the reference block according to the position and the first sample value of the reference block comprises:
constructing the prediction block of the current block by performing vertical minor transform on the reference block according to the position and the first sample value of the reference block.

17. The method of claim 13, wherein determining whether to perform mirror transform on the reference block according to the mirror mode flag and the minor type flag comprises:
determining not to perform mirror transform on the reference block when the minor mode flag is a first identifier and the mirror type flag is the first identifier.

18. The method of claim 12, wherein the reference block is located in a current picture where the current block is located, or the reference block is located in a decoded picture before the current picture is decoded.

19. An electronic device, comprising:
at least one processor; and
a memory coupled to the at least one processor and storing at least one computer executable instruction thereon which, when executed by the at least one processor, causes the at least one processor to:
parse a bitstream to obtain mode information of an intra block copy-minor mode when in a non-merge mode of intra block copy;
determine whether to perform mirror transform on a reference block according to the mode information; and
construct a prediction block of a current block by performing minor transform on the reference block, when a determination result is performing mirror transform on the reference block.

20. The electronic device of claim 19, wherein the at least one processor configured to determine whether to perform minor transform on the reference block according to the mode information is configured to:
obtain a minor mode flag and a mirror type flag contained in the mode information, wherein the mirror mode flag and the minor type flag are obtained by a video encoder based on a magnitude relationship of a first absolute difference, a second absolute difference, and a third absolute difference, wherein
the first absolute difference is an absolute difference between a first sample value of the current block and a first sample value of the reference block determined by the video encoder, the second absolute difference is an absolute difference between the first sample value of the current block and a second sample value of the reference block determined by the video encoder, and the third absolute difference is an absolute difference between the first sample value of the current block and a third sample value of the reference block determined by the video encoder; and
determine whether to perform mirror transform on the reference block according to the minor mode flag and the mirror type flag.

* * * * *